(12) United States Patent
Finley et al.

(10) Patent No.: US 7,584,179 B2
(45) Date of Patent: Sep. 1, 2009

(54) METHOD OF DOCUMENT SEARCHING

(76) Inventors: William Derek Finley, 62 Foothills Drive, Ottawa, Ontario (CA) K2H 6K3; Christopher William Doylend, 3260 Panmure Road, Ottawa, Ontario (CA) K0A 2H0; Gordon Freedman, 54 Cimarron Crescent, Nepean, Ontario (CA) K2G 6C9

( * ) Notice: Subject to any disclaimer, the term of this patent is extended or adjusted under 35 U.S.C. 154(b) by 298 days.

(21) Appl. No.: 11/698,971

(22) Filed: Jan. 29, 2007

(65) Prior Publication Data

US 2007/0192284 A1    Aug. 16, 2007

Related U.S. Application Data

(60) Provisional application No. 60/762,514, filed on Jan. 27, 2006.

(51) Int. Cl.
*G06F 7/00* (2006.01)
*G06F 17/30* (2006.01)

(52) U.S. Cl. .............................. 707/3; 707/5

(58) Field of Classification Search ............... 707/1–5, 707/10, 104.1
See application file for complete search history.

(56) References Cited

U.S. PATENT DOCUMENTS

| | | | |
|---|---|---|---|
| 6,574,622 B1 * | 6/2003 | Miyauchi et al. | 707/4 |
| 2003/0229624 A1 * | 12/2003 | Petrisor et al. | 707/3 |
| 2004/0249809 A1 * | 12/2004 | Ramani et al. | 707/4 |
| 2007/0038614 A1 * | 2/2007 | Guha | 707/4 |
| 2007/0168409 A1 * | 7/2007 | Cheung | 708/400 |

* cited by examiner

*Primary Examiner*—Don Wong
*Assistant Examiner*—Merilyn P Nguyen
(74) *Attorney, Agent, or Firm*—Freedman & Associates

(57) ABSTRACT

A method of searching is performed by providing a term for use in searching of information. The term is useful in determining documents relating to the term. In response to the provided term, search results within a search result set are determined. The search results include an indication of some of the documents relating to the term. The search result set defines a resulting search space. A further term is provided for reducing the search result set or expanding thereof. The further term is provided based on the term, terms relating to documents within the search space, and the resulting search space.

10 Claims, 4 Drawing Sheets

METHOD OF DOCUMENT SEARCHING

This application claims the benefit of U.S. Provisional Application No. 60/762,514, filed on Jan. 27, 2006, the entire contents of which are incorporated herein by reference.

FIELD OF THE INVENTION

The invention relates to data retrieval and more particularly to searching for data within a data store.

BACKGROUND

Current methods for the organization and presentation of large amounts of data are often inadequate to the needs of those in search of information. As an example, consider an Internet search engine such as Google.com or Ask.com. A user is first asked to input search terms in response to which the program conducts a search of its database and displays the results in list form in an order determined by the program's estimate of the relevance of each URL. In the case of Google.com, the ranking is based on the number of times other pages link to a particular URL. As is apparent to anyone with experience using either of these services, they are excellent at locating the proverbial "needle in a haystack," if you know exactly what your particular needle looks like. However, in the majority of cases, users do not know what they are searching for with sufficient precision to take advantage of the program's capacity to accurately locate information. This often results in a long and laborious process with users clicking slowly through a very long list of URLs, manually checking each one.

Narrowing the scope of a search, and thus shortening the list of URLs to check, is currently accomplished by adding more search terms; however, when the user is unfamiliar with the subject area and the information associated with the terms provided, they may not be sufficiently familiar with the associated terminology to narrow the scope of the search appreciably without significant work.

It is also possible that the area of inquiry has changed or that the literature has changed since the user acquired familiarity with it. If this is the case then the user, even if they are familiar with some terminology, may not be familiar with all the associated terminology. If such a user proceeds to perform a very narrow search they run the risk of missing some results that are relevant. If such a user proceeds to perform a more general search they are hardly better off than a user with no familiarity with the subject.

It is also apparent that as the number of potential new terms that could be added in order to achieve the user's desired result increases, the complexity of the operation necessarily increases exponentially. The user currently has no way to gauge the possible effect of introducing a single new term to the search, to say nothing of multiple new terms. The repetitive process of "guess and fix it" can be both frustrating and time consuming.

In an attempt to increase revenue, Ask.com provides a method to drive users to their sponsors sites by suggesting search terms that are favourable to their advertisers and billing methods. Unfortunately, though this may drive additional revenue, it is not truly intended to facilitate searching and does not do so.

It is increasingly common for search results to be accompanied by advertisements. The primary goal of advertising along with search results is generally to use the search terms to tailor the advertising to the user performing the search. In theory, if the ad is related to the search results then it should be related to the user's needs at the time and is more likely to result in increased business for the sponsor, increased revenue for the service provider, and a higher number of satisfied customers. Unfortunately, the ads that are displayed on search services are often of little relevance to a user. This results in wasted effort on the part of both advertisers and search providers.

Alternatively, there are also times when a user wishes to expand search results. This happens when a user provides very specific or uncommon terms to a search engine. In this case the search engine returns few or even zero results. To expand a search there are several options. For example, expanding a search is performed by removing one or more search terms from the query. However, it is not always easy to decide which terms to remove or what will result. Removing one term may have not effect at all while removing another could greatly expand the scope of the search and yield many more results. Users are currently without any recourse except to blindly guess at which term to remove to achieve their desired result.

It is also apparent that as the number of terms that must be removed in order to achieve the user's desired result increases, the complexity of the operation necessarily increases exponentially. The user currently has no way to gauge the possible effect of removing a single term from the search, to say nothing of multiple terms. The repetitive process of "guess and fix it" can be both frustrating and time consuming.

It would be advantageous to provide a method for improved searching and for improved advertising in association with searching.

SUMMARY OF EMBODIMENTS OF THE INSTANT INVENTION

According to an aspect of the instant invention there is provided a method comprising: receiving at least one term for use in searching of information, the at least one term for use in determining documents relating to the at least one term; providing search results within a search result set, the search results including an indication of at least some of the documents relating to the at least one term, the search result set defining a resulting search space; and, providing at least one further term, the at least one further term provided for reducing the search result set, the at least one further term provided in dependence upon the at least one term and terms relating to documents within the search result set, the at least a further term relating to the resulting search space.

In accordance with another embodiment of the invention there is provided a method comprising: receiving at least one term for use in searching of information, the at least one term for use in determining documents relating to the at least one term; providing search results within a search result set, the search results including an indication of at least some of the documents relating to the at least one term and the search result set forming a subsequent search space; and, providing at least one further term, the at least one further term provided for expanding the search result set, the at least one further term provided in dependence upon the at least one term and terms relating to documents within the search result set and the subsequent search space.

BRIEF DESCRIPTION OF THE DRAWINGS

Exemplary embodiments of the invention will now be described in conjunction with the following drawings, in which similar reference numerals designate similar items.

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and the scope of the invention. Thus, the present invention is not intended to be limited to the embodiments disclosed, but is to be accorded the widest scope consistent with the principles and features disclosed herein.

An embodiment of the present invention relates to a method of conducting a search of information whereby the user of the search tool need only specify some initial search term or terms and the program itself will supply a list of additional terms which the user can then choose to add to the provided search terms in order to narrow the results in a manner desired by the user. Advantageously, the additional search terms are determined by the results of the search of the initial term(s). This often renders searching for material with which the user is not intimately familiar simpler and less time consuming.

Figure 1:
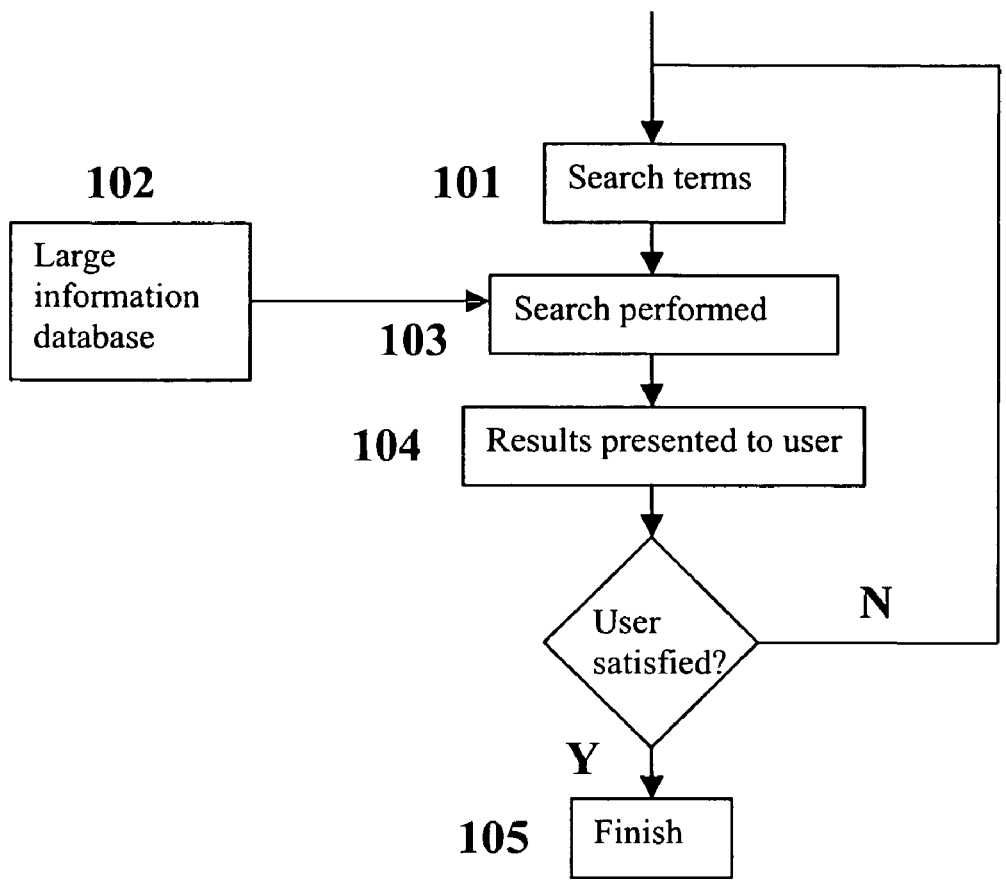
FIG. 1 is a simplified flow diagram of the search process in the prior art.

FIG. 1 is a simplified flow diagram of the search process in the prior art. At 101 the user enters search terms. A search of the database 102 is then performed at 103. The results are presented to the user at 104. If the user is satisfied with the results the process is complete, at 105. However, if the user is not satisfied, there is little else to do except choose a new set of search terms or expand the current set of search terms and begin the search process anew. It will be noted that the user is left entirely without help in deducing the search terms that will yield the desired document.

As this process is a most common search process employed, search engine research commonly focuses on three central themes—time, semantic analysis and ranking. Time is a concern because should a user need to perform eight (8) searches, the time for each search is significant in determining which search engine to use. Semantic analysis is equally important because determining what terms the user intended is central to helping the user in their search. Does a search for carpets intend for "rugs" to be included, and so forth. The third, ranking, is also important to try to get the most relevant sites at the top of the results list so that serendipitously the user finds what they are looking for even when too many results are returned.

Figure 2:
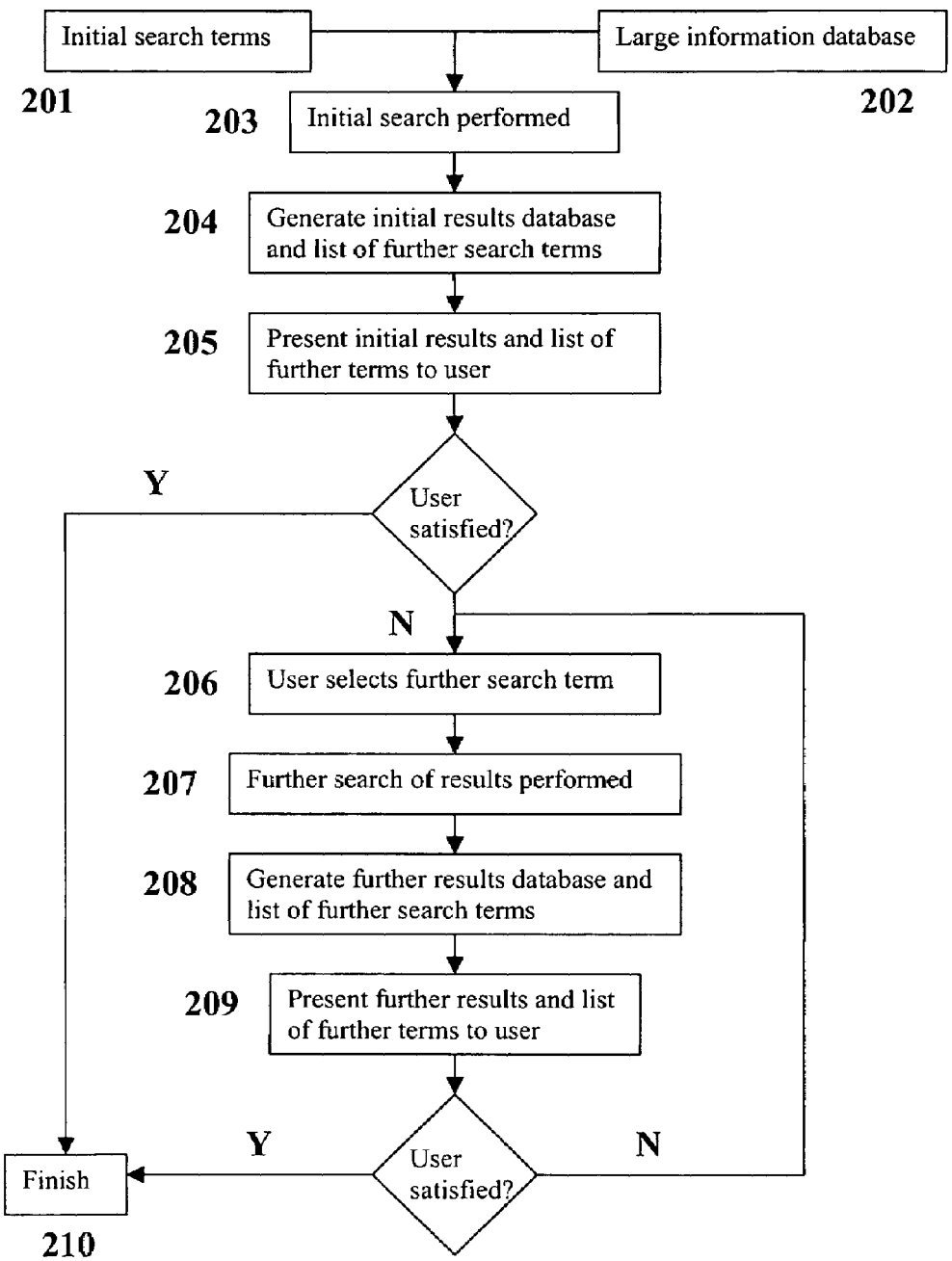
FIG. 2 is a simplified flow diagram of an embodiment of the invention.

FIG. 2 is a simplified flow diagram of an embodiment of the invention. First, a user provides at least one initial search term, 201, for use in searching large information database 202. At 203, an initial search for documents related to the at least one initial search term is performed. At 204, an initial list of results as well as a list of further search terms is generated. The list of further search terms is composed of other terms that the initial search reveals to be commonly associated with the at least one initial search term and optionally includes, for each term on the list, a measure of the change in the results that results from selecting each term. This measure of results, for example, is a proportion of the previous search results or the absolute number of search results that result if each term is selected.

At 205 the initial list of results and the list of further search terms are presented to the user. If the user is satisfied with the results of the search, the process is complete, at 210. However, if the user is not yet satisfied with the results the user chooses a term from the list of the further search terms to be added to the search, at 206. Alternatively, the user chooses one or more term from the list of the further search terms to be added to the search, at 206. Further alternatively, the user provides more search terms manually. At 207, a further search is performed. The further search is optionally performed on the entire database using all previous search terms as well as those most recently selected by the user. Alternatively the search is performed using only those documents found on the most recent list of results and the terms most recently selected by the user. Further alternatively, with each term is stored a resulting search result such that a further search is near instantaneous.

At 208 a further list of results and a list of further search terms is generated. The further list of search terms is now composed of other terms that the most recent search reveals to be commonly associated with all the search terms presently relied upon. At 209, the list of further results and the list of further search terms are presented to the user. If the user is satisfied with the results the process is complete, at 210. However, if the user is not satisfied steps 206-209 repeat until such a time as the user is satisfied.

Though the above description discusses search results, the search results are alternatively viewed as a search space. Within each search space, a list of suggested terms is providable for dividing the search space in a known fashion.

Figure 3:
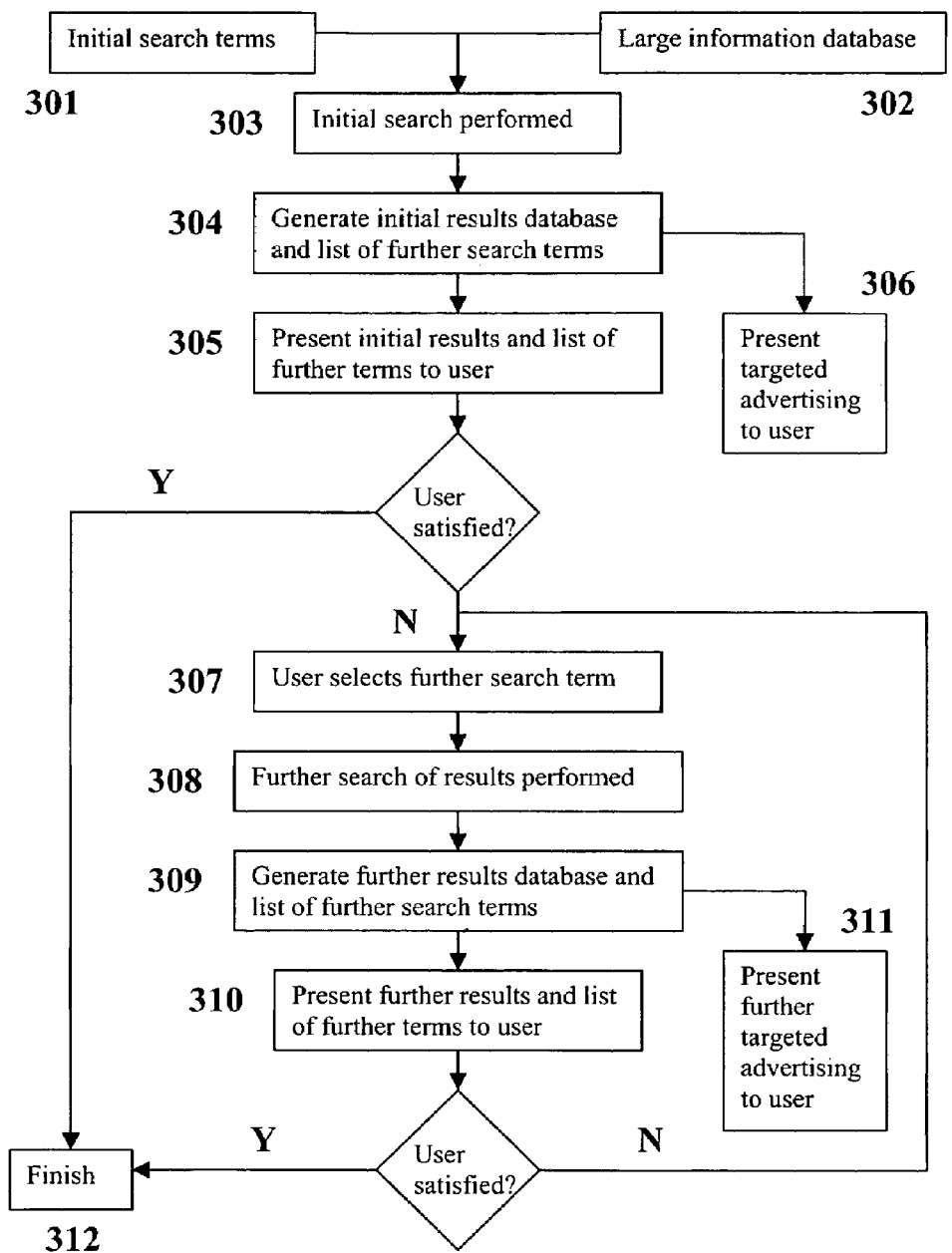
FIG. 3 is a simplified flow diagram of an alternative embodiment of the invention; and, FIG. 4 is a simplified representation of one method for displaying the possible further search terms to the user.

FIG. 3 is a simplified flow diagram of an alternative embodiment of the invention. This embodiment includes the possibility to present targeted advertising to the user. First, the user provides at least one initial search term 301 for use in searching the large information database 302. At 303, the initial search for documents related to the at least one search term is performed. At 304, an initial list of results as well as a list of further search terms is generated. The list of further search terms is composed of other terms that the initial search reveals to be associated with the at least one initial search term and optionally include, for each term on the list, a measure of the change in the results that results from selecting each term. This measure of results optionally takes the form of a proportion of the previous search results—a present search space—or the absolute number of search results that result if each term is selected.

At 305 the initial list of results and the list of further search terms are presented to the user. Advertising is presented to the user along with the initial list of results and the list of further search terms, at 306. The choice of advertising to present is based on the initial search terms as entered by the user; alternatively stated, the choice of advertising is based on the present search space. If the user is satisfied with the results of the search the process is complete, at 312. However, if the user is not yet satisfied with the results the user chooses one or more terms from the list of the further search terms to be added to the search, at 307. At 308, a further search is performed. The further search is performed on the entire database using all previous search terms as well as those most recently selected by the user. Alternatively, the search is performed using only those documents found on the most recent list of results—the present search space—and the terms most recently selected by the user. At 309 a narrower further list of results and a list of further, more specific, search terms are generated. The list of further search terms is now composed of other terms that the most recent search reveals to be commonly associated with all previously used search terms. At 310, the list of further results—the now present search space—and the list of further search terms are presented to the user. Advertising is presented to the user along with the list of further results and the list of further search terms, at 311. The choice of advertising to present is based on all the search terms relied upon for the most recent search, as entered or selected for inclusion by the user. If the user is satisfied with the results the process is complete, at 312. However, if the user is not satisfied steps 307-311 repeat until such a time as the user is satisfied. With each repetition the user is likely to be narrowing the search further and closing in on the desired information. It should be noted that as the user gets closer to the desired document the search terms increase in both number and specificity. This information is a great benefit to advertisers and is highly useful in micro-targeting advertising. The more information the user has supplied about the sought after search space the more specific targeting is achievable for an advertisement.

Figure 4:
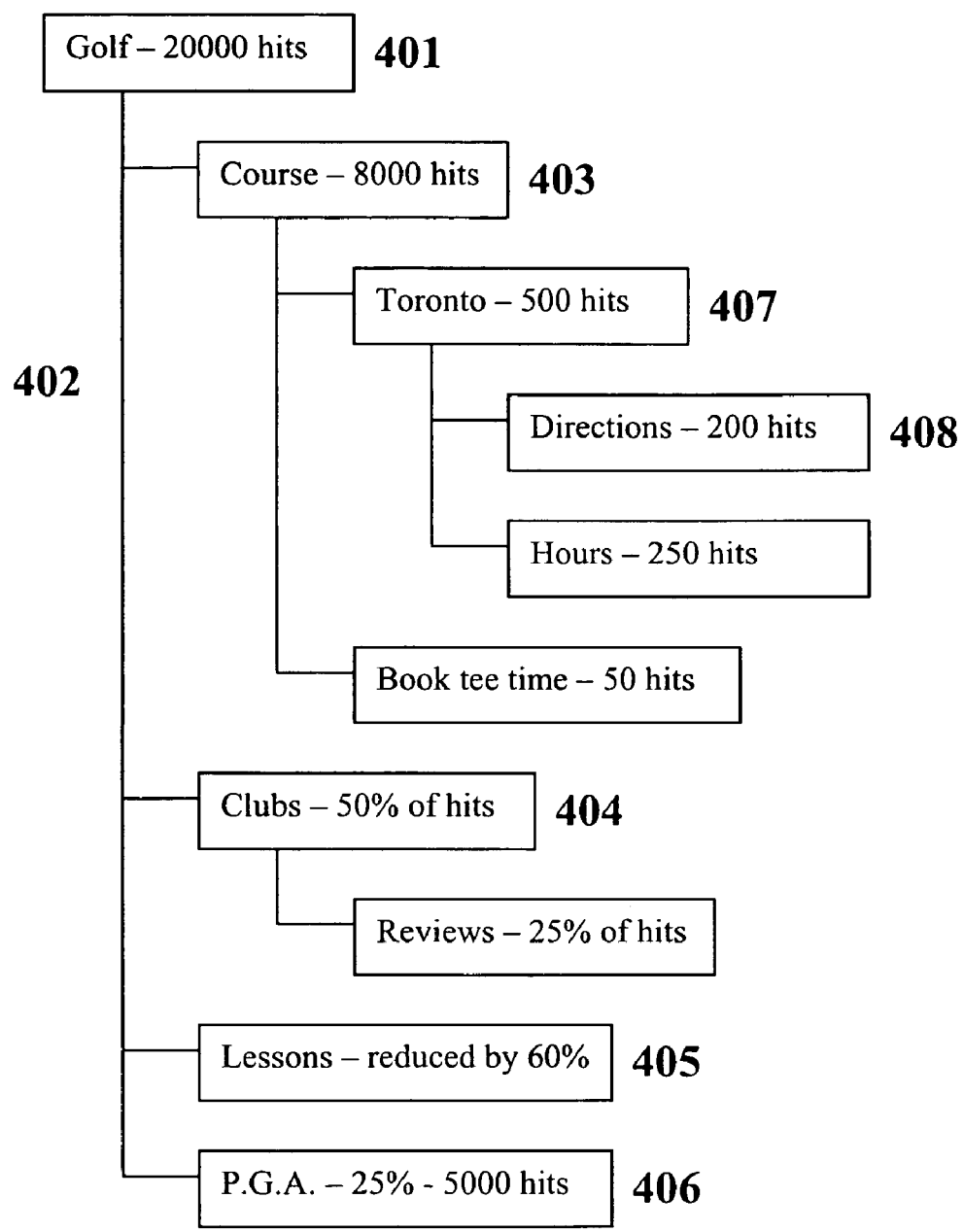

FIG. 4 is a simplified representation of one method for displaying the possible further search terms to the user. A similar diagram may be presented to the user along with each successive round of search results. This diagram uses a fictional search for the term "golf" as an illustrative example. The previous search term(s) along with the number of results are displayed at the top of a tree diagram, at 401. In this case "golf" was the initial search term. If, however, this was not the first search, or the user entered more than one term as the initial search this box would contain multiple terms. The diagram has a coherent, branching structure with several levels, as shown at 402. The tree contains at least one level with at least one branch in each. There is no theoretical limit to the number of levels such a diagram might contain. The number of levels displayed is determined by the results of the search, user preferences and practical display considerations. The number of branches at each level is determined by the results of the search, user preferences and practical display considerations. The most common terms associated with the previous search term(s) are listed at the first level. Alternatively, the most useful terms for narrowing the search space in a known fashion—for example by approximately 50%. Along with the terms is optionally listed a measure of the change in results that would come from selecting that term. This measure could take the form of an absolute number of results, as at 403. It could take the form of a proportion of previous results, as at 404. It could also take the form of a proportion of results removed as at 405 or a combination of an absolute number and a proportion as at 406.

When the user selects a term a further search is performed using the term or terms selected and another tree is presented to the user; this time with the previous selected added to the previous search terms box while a new tree is generated. For example, by selecting the term "lessons" at 406, the user causes another search to be performed using "golf" and "lessons" as the search terms and another tree diagram is generated and presented along with the search results. However, if a user selects a term at a deeper level the user causes the next search to be performed using all previous terms, the selected term and all terms connecting the previous terms to the selected term. For example, by selecting "Toronto," at 407, the next search is performed using "golf" "course" and "Toronto" as the search terms. Selecting "directions," at 408, causes the next search to be performed using "golf," "course," "Toronto" and "directions" as the search terms. Optionally, the tree structure is collapsible, by branch and by level, to make it easier for the user to navigate.

For further clarity, there are at least two methods for calculating the reduction or expansion of the search results associated with the further search terms and presenting the changes to the user. First, the results are presentable based on predetermined correlations. In many cases, since the search tool updates its database of documents associated with search terms on an ongoing basis, the program optionally calculates the correlations between search terms at this time for easy presentation of results later. The program calculates and stores data regarding the reduction or expansion in search results for many combinations of search terms and stores this data in advance of the user making a search request. This has several advantages. A first is a reduction in time required to fulfill user requests. Retrieval and display of stored data is faster and simpler than retrieval combined with analysis, calculations and display. A second is a possible reduction in the overall number of calculations. When multiple users or the same user multiple times, request a same or similar search then, in the absence of stored data regarding associations of search terms, identical or substantially similar calculations are required for every repetition of the search.

Second, the results are presentable based on calculations made at the time of the request. Naturally, there will also be times when it is disadvantageous or impossible to perform statistical calculations and store the data in advance of a user request. For example, this would be a disadvantage in the case of a search involving data that changes very rapidly such as weather data. This is the case since the complexity of the calculations increases rapidly with both search terms and documents and the data is changing dynamically in parallel. Optionally, the information is pre-calculated and a user has an opportunity to update the determination if necessary.

When judicious use is made of both of these methods in combination the final result is a more efficient search process. For example, predetermined correlations are used for searches with fewer search terms or searches that are commonly requested by users while correlations are calculated as requested for searches with fewer documents and uncommonly requested searches. It is entirely plausible for the process, while performing searches for a single user on a single quest for information to make use of both methods, likely the predetermined correlations at first followed by correlations calculated upon request once the number of search terms grows and the number of documents decreases. An alternative embodiment includes active monitoring of the different methods and continual adjustments of the circumstances in which each is used in order to improve overall performance.

When predetermination is used, there are several options for determining the results. For example, a recursive process is executed on the overall search space. An indexing process determines a search engine database for the search space. Then, with a first term in the database, a new search space is determined and the process is then re-executed for the new search space. The process recurses until all search spaces greater than a predetermined size have been processed.

Of course, such a process applied to the world wide web results in a vast amount of data. Advantageously, this data is pruned such that identical search spaces are pruned form the data structure resulting in substantial space savings. For example, searches of "golf course" and of "course golf" have a same resulting search space. Thus, the two search spaces require only a single data entry for both. Further, processing of one results in results for both, thus saving processing time.

Implementation of the pruning methodology is optionally as follows: select a first search space; process it in a predetermined fashion; select a next search space and process it according to a same predetermined process, the same predetermined process verifying a uniqueness of the search space prior to processing thereof. If the search space is not unique—it has occurred previous—the search space is replaced by the already processed search space and the routing is exited—the recursion path is terminated.

Of course, when the database also includes pointers backward—up the data path—it is useful to broaden search results. Suggested terms would include most or all of the present search results and further results. Storing of this data is greatly facilitated by the pruning process described above.

Of course a second method of pruning is by evaluation of spatial overlap. Here, when two search spaces are substantially close, one to another, their search queries are deemed equivalent. Though this results in some equivalents that are clearly not so, it is also quite effective in determining correlated terms allowing for increased information to be derivable from the data structure. With this further information, a user is able to see correlations between search spaces that are not evident absent a mathematical correlation process. Further, a user is able to see why some search terms are clearly superior to others even when they are not search terms the user would have chosen, or even considers relevant. Finally, it is sometimes advantageous to realize that there is a superior search space to a search space in which one is operating and, as such, the additional information is often times quite valuable.

In an embodiment, stored with data associated with each search space is a popularity of suggested terms for said search space. As such, more often selected suggestions are given priority when suggested to users of less often selected suggestions. For a search space with 500 terms that divide the search space approximately in half, the suggested terms are selected at random. Once sufficient user feedback as to useful terms—those selected by users—is received, for example a million entries, the process weights those more popular terms more heavily such that they are presented far more often than unpopular terms. In this fashion, the system is able to learn and adapt over time to provide useful suggestions.

Though the term lexicon of terms is used, it also refers to lexicons of phrases, a form of term, or words, another form of term, or a combination thereof. Further, suggested terms are optionally suggested phrases.

Though the above description relates to processing of data with a data processor, in an alternative embodiment, data is processed by a processor and then modified in dependence upon user input data either during use thereof or for the purposes of modifying the data to improve performance and accuracy thereof.

Numerous other embodiments may be envisioned without departing from the spirit and scope of the invention.

What is claimed is:

1. A method comprising:
   iterating the steps of:
   receiving at a first system via a network interface from a remote system at least one term for use in searching of information, the at least one term for use in determining documents relating to the at least one term;
   providing search results within a search result set from the first system to the remote system, the search results including an indication of at least some of the documents relating to the at least one term, the search result set defining a resulting search space;
   providing at least one further term, the at least one further term provided for reducing the search results in the search result set by approximately 40%-60%, the at least one further term provided in dependence upon the at least one term and terms relating to documents within the search result set, the at least one further term relating to the resulting search space; wherein the resulting search space is reduced over an earlier search space by approximately two to the power of a number of terms selected since the earlier search space.

2. A method according to claim 1 wherein the at least one further term is for reducing the search result set to a proportion thereof, the proportion within predetermined limits.

3. A method according to claim 1 where the proportional reduction in results associated with each choice for the at least one further term is displayed along side each choice for the at least one further term.

4. A method according to claim 3 wherein correlations between search terms are predetermined and stored within a database wherein a change in the search space resulting for a particular choice of the at least one further term that are displayed alongside each of the choices for the at least one further term is known prior to the user's search request.

5. A method according to claim 3 wherein correlations between search terms are not predetermined so that the change in the search results that would be found for a particular choice of the at least one further term that are displayed alongside each of the choices for the at least one further term must be calculated upon the user's request.

6. A method according to claim 1 wherein the method is applied to a search of the Internet and wherein the search results displayed are links to URLs.

7. A method according to claim 1 wherein the search results are ordered by importance based on an ordering of the search terms.

8. A method according to claim 1 comprising:
   selecting at least one of the at least a further search term(s);
   performing a search based on the at least one term and the at least one of the at least a further search term(s);
   providing search results within a search result set, the search results including an indication of at least some of the documents relating to the at least one term and to the at least one of the at least one further search term(s), the search result set forming a further subsequent search space; and,
   providing at least another one further search term, the at least another one further search term provided for reducing the further subsequent search space, the at least another one further search term provided in dependence upon the at least one term, the at least one of the at least one further search term(s), and terms relating to documents within the search result set and relating to the further subsequent search space.

9. A method according to claim 8 comprising:
   targeting advertisements to a user of the system based on the at least one term, and
   the at least one of the at least one further search term is used to further target advertising to user.

10. A method according to claim 8 wherein the documents relate to media comprising one of films, books, and audio recordings.

* * * * *